US009210446B2

(12) United States Patent
Kumar et al.

(10) Patent No.: US 9,210,446 B2
(45) Date of Patent: Dec. 8, 2015

(54) SLICE PRIORITY PREDICTION SYSTEM FOR H.264 VIDEO

(75) Inventors: Sunil Kumar, San Diego, CA (US);
Barbara Bailey, San Diego, CA (US);
Seethal Paluri, San Diego, CA (US)

(73) Assignee: SAN DIEGO STATE UNIVERSITY RESEARCH FOUNDATION, San Diego, CA (US)

( * ) Notice: Subject to any disclaimer, the term of this patent is extended or adjusted under 35 U.S.C. 154(b) by 305 days.

(21) Appl. No.: 13/611,516

(22) Filed: Sep. 12, 2012

(65) Prior Publication Data
US 2014/0376645 A1 Dec. 25, 2014

Related U.S. Application Data

(60) Provisional application No. 61/533,401, filed on Sep. 12, 2011.

(51) Int. Cl.
*H04N 19/89* (2014.01)
*H04N 19/134* (2014.01)

(52) U.S. Cl.
CPC ..................... *H04N 19/89* (2014.11)

(58) Field of Classification Search
CPC ........... H04N 47/50; H04N 7/68; H04N 7/64; H04N 7/26244; H04N 21/2383
USPC ...................................................... 375/240.1
See application file for complete search history.

(56) References Cited

U.S. PATENT DOCUMENTS

| 2006/0109805 A1* | 5/2006 | Malamal Vadakital et al. ............................. 370/299 |
| 2010/0082321 A1* | 4/2010 | Cherkasova et al. ............ 703/22 |

OTHER PUBLICATIONS

Sandeep Kanumuri et al, Predicting H.264 Packet Loss Visibility using a Generalized Linear Model, Sep. 2006, IEEE Transactions on Image Processing, 2006, pp. 2245-2248.*

Ting-Lan Lin et al, A Versatile Model for Packet Loss Visibility and its Application to Packet Prioritization, Dec. 18, 2009, IEEE Transactions on Image Processing, vol. 19, No. 3, Mar. 2010, pp. 721-735.*

* cited by examiner

*Primary Examiner* — Richard Torrente
*Assistant Examiner* — Marnie Matt
(74) *Attorney, Agent, or Firm* — Todd L. Juneau

(57) ABSTRACT

The invention relates to systems and methods for prioritizing video slices of H.264 video bitstream comprising: a memory storage and a processing unit coupled to the memory storage, wherein the processing unit operates to execute a low complexity scheme to predict the expected cumulative mean squared error (CMSE) contributed by the loss of a slice of H.264 video bitstream, wherein the processing unit operates to execute a series of actions comprising assigning each slice a predicted value according to the low complexity scheme; extracting video parameters during encoding process, said video parameters; and using a generalized linear model to model CMSE as a linear combination of the video parameters, wherein the video parameters are derived from analytical estimations by using a Generalized Linear Model (GLM) over a video database, encompassing videos of different characteristics such as high and low motion, camera panning, zooming and still videos, further comprising wherein the GLM is constructed in a training phase as follows: determining the distribution of the computed CMSE to be a Normal distribution with the Identity link function; sequentially adding covariates using the forward selection technique where by the best model is evaluated at each stage using the Akaike's Information Criterion (AIC); the training phase of the model generates regression coefficients; the final model is validated through the testing phase by predicting the CMSE for different video sequences, not in the training database; and by using the regression coefficients, the expected CMSE values are predicted for each slice.

9 Claims, 8 Drawing Sheets

SLICE PRIORITY PREDICTION SYSTEM FOR H.264 VIDEO

CROSS REFERENCE TO RELATED APPLICATIONS

This patent application claims priority to U.S. provisional patent application 61/533,401, filed Sep. 12, 2011, pursuant to 35 USC 119(e).

STATEMENT REGARDING FEDERALLY SPONSORED RESEARCH OR DEVELOPMENT

This invention was made with Government support under contract FA750-08-1-078, awarded by the U.S. Air Force Research Laboratory. The Government has certain rights in the invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

1. Field of the Invention

This invention relates to technology to mitigate degradation and distortion of video transmission over wireless networks.

The demand for real-time video transmission over wireless networks is rapidly increasing. In order to efficiently utilize wireless bandwidth, video data is compressed using sophisticated encoding techniques such as H.264 AVC.

Transmission of compressed video over wireless channels is highly susceptible to channel errors, which introduce the packet losses, delay, jitter-causing error propagation and severe quality degradation. In H.264, the error resiliency schemes, such as flexible macroblock ordering (FMO), data partitioning, and concealment, help to minimize the effects of channel impairments. Each video frame is divided into independently coded slices that consist of certain number of macroblocks. The distortion contributed by a slice loss is characterized by its spatio-temporal coding dependencies within the compressed bitstream. For example, a slice loss in a reference frame is likely to propagate to the subsequent frames that are predicted from it.

Since compressed video is vulnerable to impairments, it is useful to gauge the quality degradation caused by slice losses. A widely used measure of distortion introduced by a slice loss is the cumulative mean squared error (CMSE), which takes into account the effect of temporal error propagation measured over the group of pictures (GOP). However, computing CMSE for each slice loss is a computationally intensive process that introduces delay because it requires decoding all the frames of a GOP. The subject technology comprises a robust, low-complexity, and low-delay model to predict the CMSE contributed by the loss of each individual H.264 AVC video slice. In this scheme, a generalized linear model (GLM) is built using the video factors extracted during the encoding of current video frame, such as motion vectors, initial mean squared error, temporal duration, maximum residual energy, and signal characteristics. For a database of video sequences, the model is trained by using the measured CMSE contributed by the loss of each individual slice (known as ground truth) for all the slices of a video sequence. To keep the complexity of the model low, no video factors that require decoding of future frame(s) in the GOP are used.

The goals of the subject invention are: to develop a robust model for slice CMSE prediction and to demonstrate the effectiveness of slice prioritization schemes using the slice CMSE prediction model. Performance of the proposed slice CMSE prediction model are to be compared with the measured slice CMSE values for the test videos encoded using two different GOP structures, varying GOP lengths, and bit rates. This model is used to design two priority assignment schemes for video slices based on their predicted CMSE values, such schemes to be applied at GOP-level and frame-level, respectively. The performance of slice prioritization schemes is also studied for two applications: (i) unequal error protection (UEP) over AWGN channels, where slices are given protection against channel errors according to their priority, and (ii) the slice discard scheme when the network is congested.

This model can be used for many real-time video applications including: (i) predicted CMSE values of slices can replace their measured CMSE values for determining the optimal fragment or aggregated packet sizes in cross layer packet fragmentation or aggregation schemes; (ii) predicting the slice loss distortion enables real-time slice prioritization for a differentiated-services network, packet scheduling in a transmitter, and traffic shaping for streaming applications; (iii) assigning a priority to the slices allows an intermediate router within a network to discard some low priority slices to minimize the quality degradation of transmitted video stream in an event of network congestion; (iv) it facilitates allocation of access categories in IEEE 802.11e or quality of service (QoS)-aware medium access control (MAC); and (v) the UEP scheme where more parity bits are assigned to higher priority slices to protect them against channel errors.

Video quality is influenced by various network dependent and application oriented factors, such as packet losses, video loss recovery techniques, and encoding configurations. A considerable effort has been made to understand the relationship between packet losses and quality degradation.

The relative importance of bandwidth, latency, and packet loss on the average consumer judgments for video conferencing has also been the subject of study.

Studies were conducted to evaluate the video quality for wireless networks. Real-time video monitoring has two basic requirements. First, the video quality model should account for various network and application parameters accurately. Second, the complexity of parameter calculation should be kept at a minimum. Fulfilling these requirements will facilitate an accurate and efficient mapping of a model to the video quality. In an effort to develop a quality monitor, the authors in [4] estimated the mean squared error (MSE) using three approaches, namely, a full-parse technique that estimates several spatio-temporal parameters from the received bitstream, a quick-parse technique that extracts the start codes and the header information, and a no-parse technique that accesses spatio-temporal parameters that rely on packet loss ratio (PLR) inside the network. This was extended in [5] by using (i) a tree structured classifier, called the classification and regression trees (CART) that labeled each possible packet loss as being either visible or invisible, and (ii) a GLM to predict the probability that a packet loss will be visible to a viewer. The effect of dual packet losses, occurring in close proximity, was investigated in [6]. The significance of scene characteristics was explored in [7] by examining packet loss impairments in MPEG-2 and H.264 compressed videos. It was shown that packet losses at scenes with still camera are more likely to be visible and scene changes with packet losses shortly before or after a scene change are less visible. A versatile GLM was developed in [3] for predicting the slice loss visibility to human observers. The model was trained on a dataset of different videos using the MPEG-2 and H.264 encoding standards, two GOP structures, and other encoding configurations by considering loss of one slice at a time. Various video parameters affecting the packet loss visibility were considered in the model.

2. Background of the Invention

The current state of knowledge is as follows.

The disclosed technology is a robust, low-complexity, and low-delay generalized linear model (GLM) for predicting cumulative mean squared error (CMSE) contributed by the loss of individual H.264 AVC encoded video slices. The model is trained over a video database by using a combination of video factors that are extracted during the encoding of a frame. The slices are prioritized within a group-of-pictures (GOP) based on their predicted CMSE values.

This scheme is extended to the frame-level by estimating the expected number of slices contributed towards the different priorities based on the slice's CMSE, frame type and location within the GOP, and video motion activity.

The accuracy of the CMSE prediction model is analyzed using scatter plots, analysis of variance (ANOVA), and leave-one-out cross-validation to determine the normalized root mean squared deviation (NRMSD). The priority misclassification of the slices is computed, and shows that 2° and 3° misclassifications are minimum. The schemes are validated by applying the unequal error protection (UEP) using rate compatible punctured convolutional (RCPC) codes to the prioritized slices and evaluate their performance over a noisy AWGN channels.

An application of the slice prioritization scheme is demonstrated by implementing a slice discard scheme, where the slices are dropped from the router when the network experiences congestion. The simulation results show that the slice CMSE prediction model is robust to varying GOP structures, GOP lengths, and encoding bit rates. The PSNR and VQM performance of the slices prioritized using the predicted CMSE are similar to those of the measured CMSE values for different videos and channel SNRs.

The scheme of the subject invention is motivated by the subjective video packet loss visibility model proposed in [3]. However, the disclosed approach differs in the following important ways.

First, instead of predicting the slice loss visibility, the model disclosed herein predicts the CMSE distortion introduced by a slice loss. Note that the CMSE is a widely used measure of distortion.

Second, the model disclosed herein assumes that the response variable (i.e., CMSE) is a continuous random variable from an exponential family of distributions. Upon selecting the Gaussian distribution, since the response variable (i.e., packet loss visibility) was Boolean in [3], the binomial family was chosen as the preferred distribution for the subject model and was implemented using logistic regression.

Third, the random forest [8] has been used in the subject model to determine the importance of video factors, which helped us in selecting additional factors based on the interactions among the most important factors.

Fourth, unlike [3], which uses the factors from future frames (e.g., DisToRef and OtherSceneConceal), the scheme of the subject model does not use any such factors.

Due to the preceding points of novelty, the model disclosed herein can be useful in frame-based slice priority assignment for applications (e.g., video conferencing) that cannot tolerate delay of even a few video frames. As a result, this model can be automatically retrained, without involving human observers, if the CMSE prediction accuracy drops below a threshold. Such retraining may be required when the video characteristics, encoder configuration, network congestion, packet loss patterns, and/or application changes significantly.

BRIEF SUMMARY OF THE INVENTION

The novel component of this work is the increased efficiency of the scheme and system disclosed over previously existing systems, specifically in reduced complexity, such that the disclosed technology can operate in real-time applications, without introducing delay, on low-complexity devices (including but not limited to hand-held or small, unmanned aerial vehicles).

In a preferred embodiment, a system for prioritizing video slices of H.264 video bitstream comprising: a memory storage and a processing unit coupled to the memory storage, wherein the processing unit is programmed to execute a low complexity scheme to predict the expected cumulative mean squared error (CMSE) contributed by the loss of a slice of H.264 video bitstream.

In another preferred embodiment, the disclosed system, wherein the processing unit operates to execute a series of actions comprising the following: (a) assigning each slice a predicted value according to the low complexity scheme of claim 1; (b) extracting parameters during encoding process; and (c) using a generalized linear model to model CMSE as a linear combination of the most important video parameters.

In another preferred embodiment, the disclosed system of the previous paragraph, wherein the parameters of step (b) are derived from analytical estimations by using a Generalized Linear Model (GLM) over a video database, encompassing videos of different characteristics such as high and low motion, camera panning, zooming and still videos.

In another preferred embodiment, the disclosed system of the previous paragraph, wherein the extracted parameters of step (b) are: Motion Vectors (Motx and Moty), Residual Energy after motion compensation (MAXRESENGY), Initial Mean squared Error (IMSE), Initial Structural Similarity Index (IS SIM), Average Inter Partitions per macroblock (MB) (AvgInterParts), Error Propagation length (TMDR), slice type (slice_type) and signal characteristics such as signal mean and variance per slice (SigMean and SigVar).

In another preferred embodiment, the disclosed system of the previous paragraph, further comprising the step of: (d) examining the interactions between IMSE and MAXRESENGY and IMSE and TMDR.

In another preferred embodiment, the disclosed system, further comprising wherein the distortion prediction is computed by using a GLM model to predict CMSE, whereby CMSE is computed over the group of pictures (GOP) by dropping one H.264 video slice at a time, and further resolving the issue of GOP delay by developing a statistical model to predict the expected distortion.

In another preferred embodiment, disclosed system, further comprising wherein the GLM is constructed in the training phase as follows: (a) determining the distribution of the computed CMSE to be a Normal distribution with the Identity link function; (b) sequentially adding covariates using the forward selection technique where by the best model is evaluated at each stage using the Akaike's Information Criterion (AIC); (c) the training phase of the model generates regression coefficients; (d) the final model is validated through the testing phase by predicting the CMSE for different video sequences, not in the training database; and (e) by using the regression coefficients, we predict the expected CMSE values for each slice.

In another preferred embodiment, disclosed system, further comprising wherein per frame priority can be assigned where the slices of each frame are classified into two or four priorities separately in systems with stringent delay requirements.

In another preferred embodiment, disclosed system, further comprising wherein the priorities can be assigned at the GOP level in delay tolerant systems.

In another embodiment, a method of identifying the video parameters (from compressed H.264 bitstream) and their contribution to predicted CMSE by using the disclosed system.

In another preferred embodiment, the method of the preceding paragraph further comprising wherein there is no need to calculate CMSE over the entire GOP.

In another preferred embodiment, the disclosed method wherein the encoder assigns priorities for each encoded slice based on its predicted CMSE without having to wait for the GOP statistics to assign the priorities unlike the traditional priority schemes.

DETAILED DESCRIPTION OF THE INVENTION

Definitions

Figure 1:
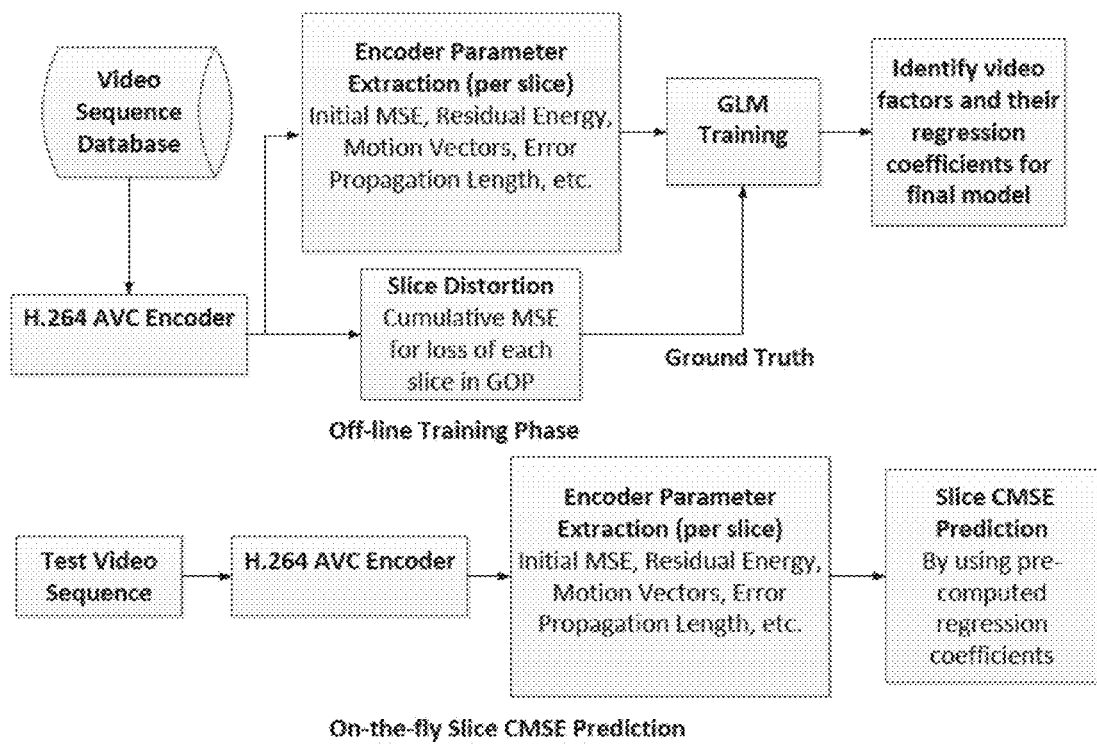
FIG. 1 is a flow chart evidencing a robust, low-complexity, and low-delay model to predict the CMSE contributed by the loss of each individual H.264 AVC video slice.

The following definitions are provided as an aid to understanding the detailed description of the present invention.

The word "slice" or phrase "video slice" shall mean a spatially distinct region of a frame that is encoded separately from any other region in the same frame.

The term "Group of Pictures" (GOP) shall mean the order in which intra- and inter-frames are arranged. The GOP is a group of successive pictures within a coded video stream. Each coded video stream consists of successive GOPs. From the pictures contained in it, the visible frames are generated.

The term "Generalized Linear Model" (GLM) means a flexible generalization of ordinary linear regression that allows for response variables that have other than a normal distribution. The GLM generalizes linear regression by allowing the linear model to be related to the response variable via a link function and by allowing the magnitude of the variance of each measurement to be a function of its predicted value.

The term "Analysis of Variance" (ANOVA) means a collection of statistical models and their associated procedures, in which the observed variance in a particular variable is partitioned into components attributable to different sources of variation. In its simplest form, ANOVA provides a statistical test of whether or not the means of several groups are all equal, and therefore generalizes t-test to more than two groups. Doing multiple two-sample t-tests would result in an increased chance of committing a type I error. For this reason, ANOVAs are useful in comparing two, three, or more means.

The word "Macroblock" (MB) means is an image compression component and technique based on discrete cosine transform used on still images and video frames. Macroblocks are usually composed of two or more blocks of pixels. In the JPEG standard macroblocks are called MCU blocks.

The term "Addictive white Gaussian noise" (AWGN) means a channel model in which the only impairment to communication is a linear addition of wideband or white noise with a constant spectral density (expressed as watts per hertz of bandwidth) and a Gaussian distribution of amplitude. The model does not account for fading, frequency selectivity, interference, nonlinearity or dispersion. However, it produces simple and tractable mathematical models which are useful for gaining insight into the underlying behavior of a system before these other phenomena are considered.

"MOTX" and "MOTY" are video motion vectors used in the motion estimation process.

The phrase "H.264 AVC" shall mean is the standard for video compression, and is currently one of the most commonly used formats for the recording, compression, and distribution of high definition video. It represents a block-oriented motion-compensation-based codec standard developed by the ITU-T Video Coding Experts Group (VCEG) together with the International Organization for Standardization (ISO)/International Electrotechnical Commission (IEC) joint working group, the Moving Picture Experts Group (MPEG). The product of this partnership effort is known as the Joint Video Team (JVT).

The phrase "video coding" shall mean computer software code required for storing and viewing video images.

The phrase "mean squared error" (MSE), shall mean a method of quantifying the difference between values implied by an estimator and the true values of the quantity being estimated. MSE is a risk function, corresponding to the expected value of the squared error loss or quadratic loss. MSE measures the average of the squares of the "errors." The error is the amount by which the value implied by the estimator differs from the quantity to be estimated. The difference occurs because of randomness or because the estimator doesn't account for information that could produce a more accurate estimate.

The phrase "slice loss" shall mean the corruption and/or loss of one or more video slices from a video transmission, causing video quality degradation.

The phrase "rate compatible punctured convolutional" (RCPC) code shall mean a type of digital video error-correcting code whereby video data is encoded using a puncturing technique, wherein m/n rate code is made from a "basic" rate ½ code, reached by deletion of some bits in the encoder output according to puncturing matrix.

The phrase "unequal error protection" (UEP) shall mean that parts of the video bitstream that are more susceptible to errors causing video disturbances are provided with more protection (i.e. a lower code rate) and vice versa.

The phrase "slice discard" shall mean an action wherein slices are dropped from the router when the network experiences congestion.

The phrase "Akaike's Information Criterion" (AIC) means an index known in the art and used to determine the order in which the covariates are fitted.

Video Factors Affecting Slice Loss Distortion

In order to build a model that predicts the CMSE, we need to understand the video factors that effect the distortion introduced by a slice loss. To minimize the complexity of our model, we consider only those factors that can be easily extracted during the encoding of a frame without depending on any future frame. Let the original uncompressed video frame at time t be f(t), the reconstructed frame without the slice loss be f̂(t), and the reconstructed frame with the slice loss be f̃(t). Then we can compute the error due to the slice loss as, e(t)=f̂(t)−f̃(t).

Motion Characteristics: The magnitude of the distortion induced by a slice loss is influenced by the presence of motion content. For example, a significant change in the motion activity between two successive frames implies that lost slices may be difficult to conceal. Therefore, we consider the motion information of each macroblock. For each slice, MOTX and MOTY are defined as the mean motion vector in the x and y directions over all the macroblocks in the slice.

AVGINTERPARTS: A slice loss in a complex scene, e.g., a crowded area, can also be difficult to conceal at the decoder, resulting in a high distortion. We let AVGINTERPARTS represent the number of macroblock sub-partitions averaged over the total number of macroblocks in the slice. If the underlying motion is complex, AVGINTERPARTS would be high.

Maximum Residual Energy (MAXRSENGY): First, Residual Energy (RSENGY) is computed for a macroblock as the sum of squares of all its integer transform coefficients after motion compensation. Then MAXRSENGY of a slice is equal to the highest RSENGY value of its macroblocks. If a scene has high motion, its MAXRSENGY would also be high.

Signal Characteristics: We consider mean SigMean and variance SigVar of the slice luminance. We also consider the slice type Slice type, such as IDR or P or B slice, and it is treated as a categorical factor in our model discussed in Section IV-B.

Temporal Duration (TMDR): We can also characterize the impact of a slice loss in the error frame by its TMDR, defined as the temporal error propagation length due to a slice loss. A slice error in a non-reference B frame has a TMDR of 1, while an error in a reference IDR slice propagates to the end of GOP.

Initial Mean Squared Error (IMSE): It is a measure of spatial extent of a slice loss within a frame and is computed as the MSE between the compressed frame f̂(t) and the reconstructed frame f̃(t) within the encoder.

Initial Structural Similarity Index (ISSIM): SSIM is a measure of the structural similarity between two frames [9]. Like IMSE, ISSIM is computed per slice using f̂(t) and f̃(t).

Cumulative Mean Squared Error (CMSE): It is computed by systematically discarding one slice at a time and measuring the distortion introduced by it in entire GOP due to error propagation. Assuming that each frame consists of N×M pixels, the MSE introduced by a slice loss in the video frame at time t is computed as $$\frac{1}{NM}\sum_{i=1}^{N}\sum_{j=1}^{M}e_{ij}(t)^2 \qquad (1)$$

The loss of a slice in a reference frame can also introduce error propagation in the current and subsequent frames within the GOP. The CMSE contributed by the loss of the slice is thus computed as the sum of MSE over all frames in the GOP. This is a computationally intensive and time consuming process. The measured CMSE was used as "ground truth" in the disclosed model.

Model Development

The disclosed model was developed using a database of thirteen video sequences shown in Table I, below. Seven of these sequences have a spatial resolution of 720×480 pixels and the remaining six sequences have a spatial resolution of 352×288 pixels. These video sequences have a wide range of content, motion, and complexity. For example, the low mobility sequences include scenes showing sign language postures, panoramic view of a large boat, and interaction between a mother and a daughter. The sequences with medium mobility include scenes of a moving coastguard boat, team march at opening ceremony, and panning view of the woods. The high mobility sequences have scenes of sporting activities, bird's eye view of the city, and crowded area with spectators.

The videos were compressed using JM 14.2 reference software of H.264 AVC, using the GOP structure IDR B P . . . B, with GOP length of 20 frames and a fixed slice configuration. The higher resolution sequences (720×480) were encoded at 2 Mbps at 30 frames per second (fps) with a slice size of 600 bytes, while the lower resolution sequences (352×288) were encoded at 720 Kbps at 30 fps with a slice size of 400 bytes.

Two reference frames were used for predicting the P and B frames. Since the compression efficiency is higher for the predicted P and B frames than the intra coded IDR frames, a slice from an IDR frame typically contains less macroblocks than a P-frame slice and significantly less macroblocks than a B-frame slice.

At the decoder, error concealment was performed using temporal concealment and spatial interpolation. The type of error concealment used depends on the frame type and the type of loss incurred. If a slice from a P or B frame is lost and sufficient motion information around the lost macroblocks is available, the decoder copies the motion vectors and the reference indices from the previously decoded reference frame(s) and performs ¼ pixel motion compensation to reconstruct the lost slice.

If sufficient motion information is not available, the co-located macroblocks from the previous reference frame are directly copied. Any slice loss from an IDR frame is concealed through spatial interpolation. A training and test set for the disclosed model development was formed by randomly splitting the database into a 70:30 ratio, with such model trained on 70% of the data and the test on the remaining 30% of the data. Note that the performance of the disclosed model has also been tested for other GOP structures, lengths and bit rates.

TABLE I

Summary of the Videos Sequences used in Database

| Motion | Resolution | Name of Sequence |
|---|---|---|
| Low | 720 × 480 | Mother and Daughter, |
|  | 352 × 288 | Boat |
| Medium | 720 × 480 | Silent |
|  | 352 × 288 | Open Ceremony, Woods |
| High | 720 × 480 | Tempete, |
|  | 352 × 288 | Coastguard Whale Show, News, Tiger City, Soccer, Football |

Overview of Model Development

GLM is used herein to predict the CMSE contributed by a single slice loss. The GLMs are an extension to the class of linear models (LM) and a flexible generalization of the ordinary least squares regression (OLS) used in LM [12]. While a LM only allows the response variable to be distributed normally, the GLM allows distributions in which the variance of the datum is a function of its mean. Let $Y=[y_1, Y_2, \ldots, y_N]^T$ be a vector of our response variable, i.e., measured CMSE values.

The linear predictor of the response variable is described as a linear combination of the video factors described in the above section Video Factors Affecting Slice Loss. Here, X is an N×m+1 matrix of covariates (i.e., video factors), where each row, $[1, x_1, x_2, \ldots, x_m]$ corresponds to a single observation from Y. Let $\beta=[\beta_0, \beta_1, \ldots, \beta_m]^T$ be a (p+1)×1 vector of unknown regression coefficients that need to be determined from the data.

The link function denoted as g(•) describes a function of the linear predictor, $g^{-1}(X\beta)$. The regression coefficients are estimated through an iteratively re-weighted least squares (IRLS) technique.

After estimating $\beta$, we use it to predict the response variable vector Y, computed as $E(Y)=g^{-1}(X\beta)$. The link function is differentiable, monotonic and typically non-linear. The GLMs allow the mean to depend on the covariates in a non-linear way. This gives flexibility in handling diverse data, as it may be difficult to estimate the true nature of the underlying probability distributions from a sample of observations.

Model Fitting

In model fitting, a subset of covariates (i.e., video factors) is chosen for the best fit of the response variable. Statistical software R [13] is used for the model fitting and analysis. The procedure for selecting the order of covariates is given below.

Figure 2:
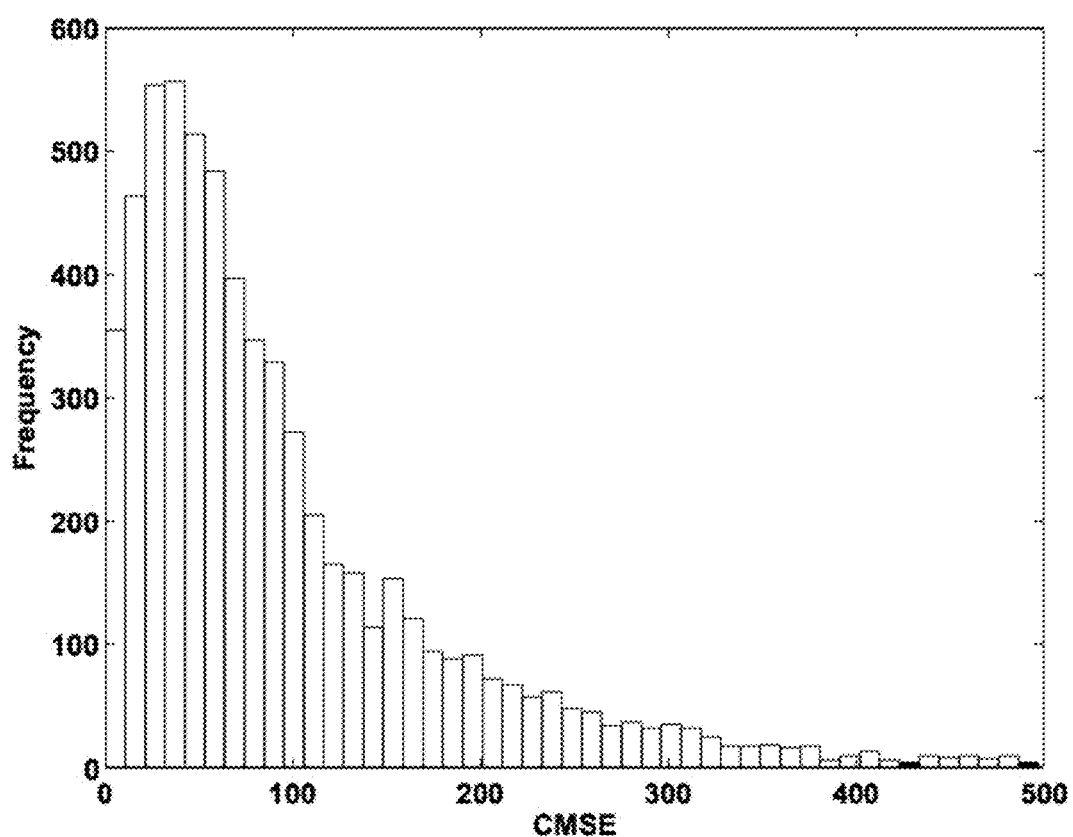
FIG. 2 is a bar chart histogram of response variable (i.e., slice CMSE values) for videos in database.

Evaluating the Distribution of Response Variable: A visual analysis of our response variable (i.e., measured CMSE) in FIG. 2 shows that low CMSE values occur more frequently than higher CMSE values. Although, the maximum CMSE value in our database is 3500, we have used the CMSE range of 0 to 500 in this figure as the frequency of higher values is very low. In order to classify our response variable to a family of distributions, we evaluate its goodness of fit to the four hypothesized distributions, namely, Weibull, Gaussian, and Gamma distributions by using three information criteria (IC): (a) SIC: Schwarz or Bayesian information criterion, (b) HQIC: Hannan-Quinn information criterion, and (c) AIC: Akaike information criterion[14]. These statistical criteria give an indication of the goodness of fit by minimizing the information loss of the model. They take into account the number of potential covariates, the number of observations (n), and the log-likelihood of the model. Among the three criterion, SIC is the most stringent in penalizing the complexity of the model (i.e., number of parameters) and is computed as the $-2 \log(L_{max})+m \log(n)$, where $L_{max}$ is the maximized value of the log-likelihood function for the fitted distribution, and m is the number of independently adjusted parameters within the model. HQIC holds the middle ground in ranking various fitted models against each other and is computed as $2 \log [\log(n)]m-2 \log(L_{max})$. Finally, the AIC is the least stringent of the three IC and is computed as $-2 \log(L_{max})+2m$. A GLM with m parameters has 2m potential models.

To determine the underlying distribution of our data, we begin by randomly choosing 4000 observations without replacement from Y. These observations are divided into 100 equal bins and maximize the likelihood function for each of the three IC. The fitted parameters for these distributions are as follows: (a) Weibull: shape parameter=1, scale parameter=0.085, (b) Gaussian: mean=0.5, standard deviation=0.3 and, (c) Gamma: shape parameter=1, scale parameter=0.05. From the IC values of these distributions in Table II, we observe that the Gaussian distribution minimizes all the three IC values, followed by the Gaussian, Weibull, and Gamma distributions. Due to its ease of interpretation, the Gaussian distribution is chosen to construct the disclosed model. Therefore, our response variable can be classified as a member of the exponential family of distributions with identity as its link function, $g^{-}(Y)=Y$.

TABLE II

Goodness of Fit Statistics for Maximized Likelihood Function

| | Fitted Distribution | | |
|---|---|---|---|
| IC | Weibull | Gaussian | Gamma |
| SIC | 17.52 | 17.50 | 17.52 |
| HQIC | 2.26 | 2.22 | 2.25 |
| AIC | 1.05 | 1.03 | 1.04 |

Choosing Covariates: We use the AIC index to determine the order of the covariates to be fitted. The decrease in IC value during covariate selection is indicative of a good model fitting process. AIC is preferred over other information criteria for model selection if the dimensionality of the covariate matrix is not high. We let Yk represent the model with a subset of k covariates. The ith data point in $Y^k$, $y_i^k$, where i=1, 2, ..., N is expressed as:

$$y_i^k = \beta_0^k + \beta_1^k x_{i1} + \beta_2^k x_{i2} + \ldots + \beta_k^k x_{ik} + \epsilon_i \qquad (2)$$

Here, $\beta_0$ is the intercept, $\beta_j^k$, j=1, 2, ..., k are the regression coefficients, $x_{ij}$ represents the $j^{th}$ covariate for the $i^{th}$ observation in $Y^k$, and i the random error term. The response variable vector is computed as $E(Y)=g^{-1}(X\beta)$ with $E(\epsilon)=0$. The simplest model is the null model having only the intercept $\beta_0^k$ whereas the full model has all the m covariates, k=m. We use a forward stepwise approach to choose the covariates.

Step 1: To select the first covariate, we fit a group of m univariate models (i.e., k=1) and compute their AIC values. The best univariate model with the smallest AIC value is chosen and represented as $Y^1=\beta_0^k+\beta_1^k x_{i1}$ Step 2: We then fit (m−1) multivariate models with two covariates each. The first covariate is chosen from Step 1 and the second covariate is chosen systematically from the remaining (m−1) covariates. We then compute the AIC values for the (m−1) models and choose one with the smallest AIC value. The model with two factors is represented as $Y^2=\beta^1+\beta^1_{xi1}+\beta^1_{xi2}$, where i=1, 2, ..., N.

Step 3: The model is extended again by adding each of the remaining (m−2) covariates to the multivariate model in step 2, one at a time, and choosing the model with the smallest AIC.

Stopping Criterion: The model is fitted with covariates until the stopping criterion is satisfied where the best model with k+1 covariates has a higher AIC value than the model with k covariates. With our data, the stopping criteria could not be satisfied even when we fitted the full model (i.e., k=m). We improved the performance of our model by introducing interactions between the most important covariates by using the random forest as discussed below.

Random Forest: We determine the importance of the factors by using a tree structured classifier, known as the random forest (RF) [8], which estimates the response variable internally (i.e., measured CMSE) from a subset of the covariates (i.e., video factors). RF consists of decision trees (typically 100,000 or more) that are grown to the full extent (i.e., trees are not pruned) using a binary recursive partitioning, where the data is split into increasingly homogeneous subsets (nodes) until it is infeasible to continue any further.

To grow a single tree, a bootstrap sample of size S with replacement is drawn from the training set of N slices, such that S<N. At each partitioning of the bootstrap sample, a random subset of covariates is examined to obtain the "best" split (i.e., the best separation of the predicted response variable range). The partitioning of each node within the tree results in two child nodes. This process is repeated until the tree is fully grown, i.e., it only contains one factor.

The remaining N−S samples, called the "out-of-bag" (OOB) data, are used to predict the response variable and compute the OOB prediction error rate. For each covariate in the tree, the OOB samples are randomly permuted and the new OOB error is computed. An increase in the OOB error w.r.t. the original OOB error indicates a decrease in the node purity and consequently a decrease in the covariate importance for a single tree. The covariate importance is averaged over all the trees in the forest. We computed the covariate importance using 100,000 trees.

Figure 3:
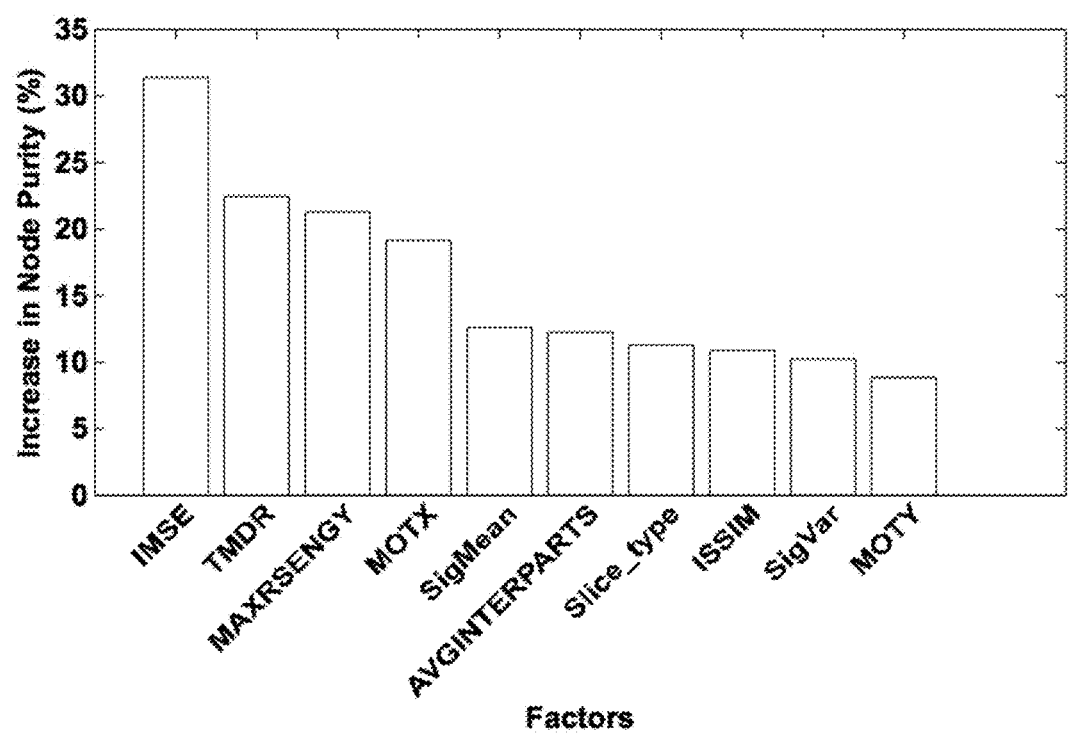
FIG. 3 is a bar graph evidencing the importance of covariates determined by the random forest.

FIG. 3 shows that the maximum increase in the node purity is achieved by IMSE, followed by TMDR, MAXRSENGY and MOTX. We introduced two interactions between the first three covariates, i.e., IMSE and TMDR, and IMSE and MAXRSENGY. Adding additional interactions did not improve the performance of our model as discussed later at the end of this section.

TABLE III

Final Model Coefficients

| Factor No. | Name of Covariate | Regression Coefficient |
|---|---|---|
| 1 | Intercept | $9.45 \times 10^1$ |
| 2 | IMSE | $1.90 \times 10^{-1}$ |
| 3 | TMDR | −1.30 |
| 4 | MAXRSENGY | $-9.88 \times 10^{-9}$ |
| 5 | MOTX | $-2.98 \times 10^{-1}$ |
| 6 | SigMean | $-3.03 \times 10^{-1}$ |
| 7 | AVGINTERPARTS | $-1.08 \times 10^1$ |
| 8a | Slice_type.f2 | $1.20 \times 10^1$ |
| 8b | Slice_type.f3 | $-1.95 \times 10^1$ |
| 9 | ISSIM | $-1.91 \times 10^1$ |
| 10 | SigVar | $-2.86 \times 10^{-3}$ |
| 11 | MOTY | −1.15 |
| 12 | IMSE x TMDR | $7.54 \times 10^{-1}$ |
| 13 | IMSE x MAXRSENGY | $1.40 \times 10^{-9}$ |

The regression coefficients of our model are reported in Table III. The final predicted CMSE value is a linear combination of the factor values and the regression coefficients. The sign of a regression coefficient does not provide an insight into its impact on CMSE. An advantage of using the GLM is that values of the factors need not be scaled. Since the value of a video factor can be quite different from others, the magnitude of a regression coefficient does not indicate its influence on CMSE value. For example, the values of MAXRSENGY in our training set are typically to the order of 109, whereas TMDR values are less than 20. Therefore, it is difficult to analyze the regression relationship of each video factor by solely examining its coefficient in Table III.

Goodness of Fit: We evaluate the goodness of fit of our model (i) by using the analysis of variance (ANOVA), and (ii) by using the "leave-one-out" cross-validation to compute the normalized root mean squared deviation (NRMSD) of the predicted CMSE.

We use the following hypothesis test to show that our regression model is more useful than the null model for predicting the CMSE. We let $H_0$ and $H_1$ represent the null model and the regression model, respectively. Then we test the hypothesis $H_0$: $\beta_1=\beta_2=\beta_3 \ldots =\beta_m=0$ against the alternative $H_1$: at least one of the $\beta_i$ is non-zero, for i=1, 2, 3 ... m. Here, m=13 represents the number of video factors shown in Table III. To analyze the significance of our regression model using the ANOVA (Table IV), we first explain the terminology used to perform the hypothesis test. The total sum of squares of the model (SSY) is the summation of the sum of squares due to regression (SSR) and the sum of squared errors (SSE) components. SSY is computed as $\Sigma_{i=1}^{\gamma}(y_i-\bar{y})^2$, where $y_i$ is the $i^{th}$ observation of the measured CMSE in training dataset with $\gamma=6233$ observations and $\bar{y}$ is the mean of the measured CMSE vector. SSE is computed as $\Sigma_{i=1}^{\gamma}(y_i-\hat{y}_i)^2$, where $\hat{y}_i$ is the $i^{th}$ predicted CMSE value in the training dataset. The degrees of freedom (df) quantifies the number of independent pieces of information and it often refers to the number of observations used to make a calculation. Let df associated with the regression and the error sources be m and n, respectively, where m=13 and n=γ−m=6220. The mean square due to regression (M SR) is computed as the ratio of SSR divided by its df. Similarly, the mean square due to error (M SE) is computed as the ratio of SSE to its df, such that M SY=M SR+M SE. Since, CMSE is a normally distributed vector, SSR and SSE follow a noncentral chi-squared distribution with degrees of freedom m and n, respectively. Finally, we compute the ratio of M SR to M SE, which is also known as the F-ratio. Since this is a ratio of two independent chi-squared distributions, it follows an F-distribution with m and n and denoted as Fm,n. From the ANOVA results shown in Table IV, the F-ratio is 1026. The corresponding probability (i.e., the p-value) that the F-ratio is greater than the observed value of 1026 is less than 2.2e-16. The smaller the probability, the more accurate the observed F-ratio is. This implies that the regression model shown in Table III is significant in predicting the CMSE accurately.

TABLE IV

ANOVA for the Proposed Model

| Source of Variation | Sum of Squares | Degrees of Freedom df | Mean Square | F ratio |
|---|---|---|---|---|
| Regression | SSR = 59631013 | m = 13 | MSR = 4587001 | 1026 |
| Error | SSE = 27813765 | n = 6220 | MSE = 4472 | |
| Total | SSY = 877444778 | γ = 6233 | MSY = 4591473 | |

Figure 4:
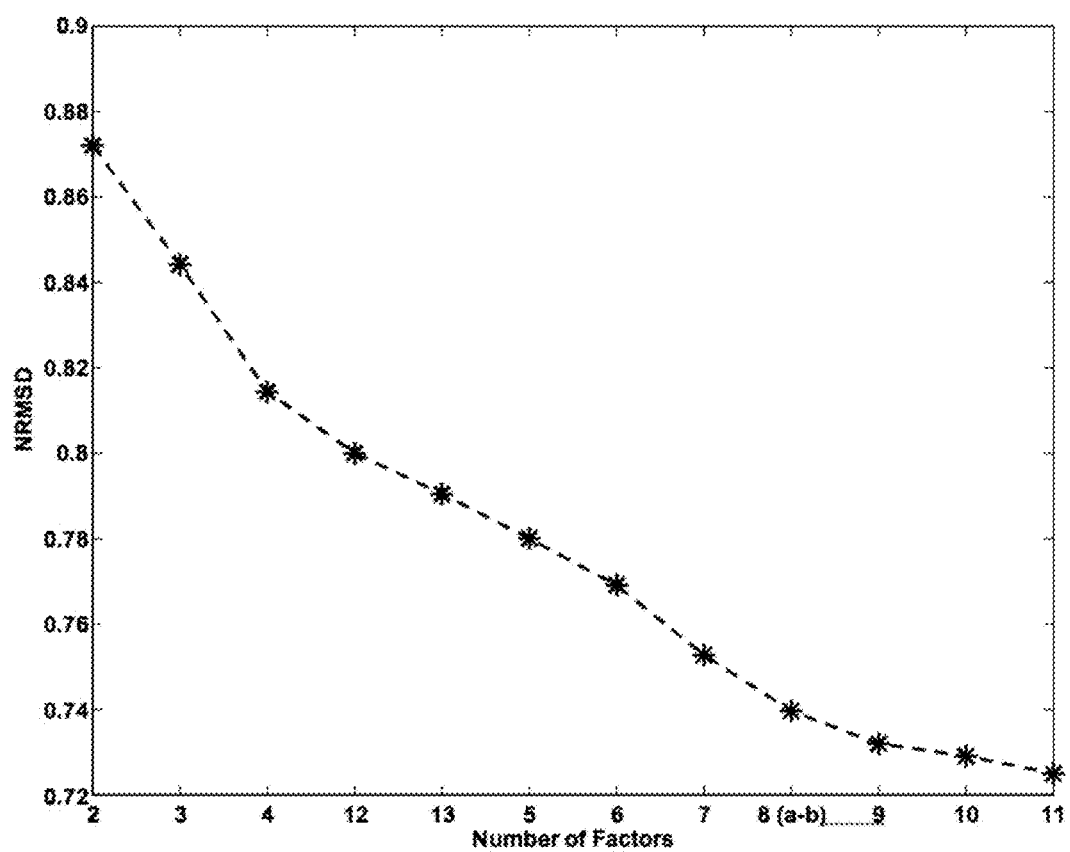
FIG. 4 is a line graph presenting a plot model of accuracy.

Next, we study the model accuracy by examining the NRMSD as the factors are added to the null model. The NRMSD is defined as the ratio of the root mean squared error (RMSE) to the range of the measured CMSE of the training set. The decrease of NRMSD indicates an improved performance of the CMSE prediction. FIG. 4 illustrates NRMSD vs. the best n factor model, where n=2, 3, 4 . . . 13 as shown in Table III. The NRMSD for the null model is 3.56. As factor 2 (IMSE) is added to the null model, the NRMSD decreases significantly from 3.56 to 0.875. This decrease is further enhanced by adding factors 3 (TMDR) and 4 (MAXRSENGY). Next, as interaction factors 12 (IMSE× TMDR) and 13 (IMSE×MAXRESENGY) are added to the model, further drop in NRMSD is observed. The decrease in NRMSD becomes more gradual when last three factors 9 (ISSIM), 10 (SigVar) and 11 (MOTY) are added. Adding additional interactions from other factors gave negligible improvement in NRMSD.

Performance of CMSE Prediction Scheme

The performance of the disclosed model is evaluated by studying (i) scatter plots of the measured vs. predicted CMSE with an analysis of the correlation coefficient $\rho$, (ii) misclassifications in the slice priority assignment, and (iii) EEP (Equal Error Protection) and UEP performance of the prioritized data over an AWGN channel. We have used four test video sequences Akiyo (352×288, slow motion), Foreman (352×288, medium motion), Bus (352×288, high motion), and Table Tennis (720×480, high motion). Akiyo, Foreman, and Bus videos were encoded at 1 Mbps and Table Tennis was encoded at 2 Mbps, using the encoding parameters given in Section IV. We also evaluate the CMSE prediction performance of our model for a different GOP structure, GOP size, and bit rate.

Slice CMSE Prediction

Figure 5:
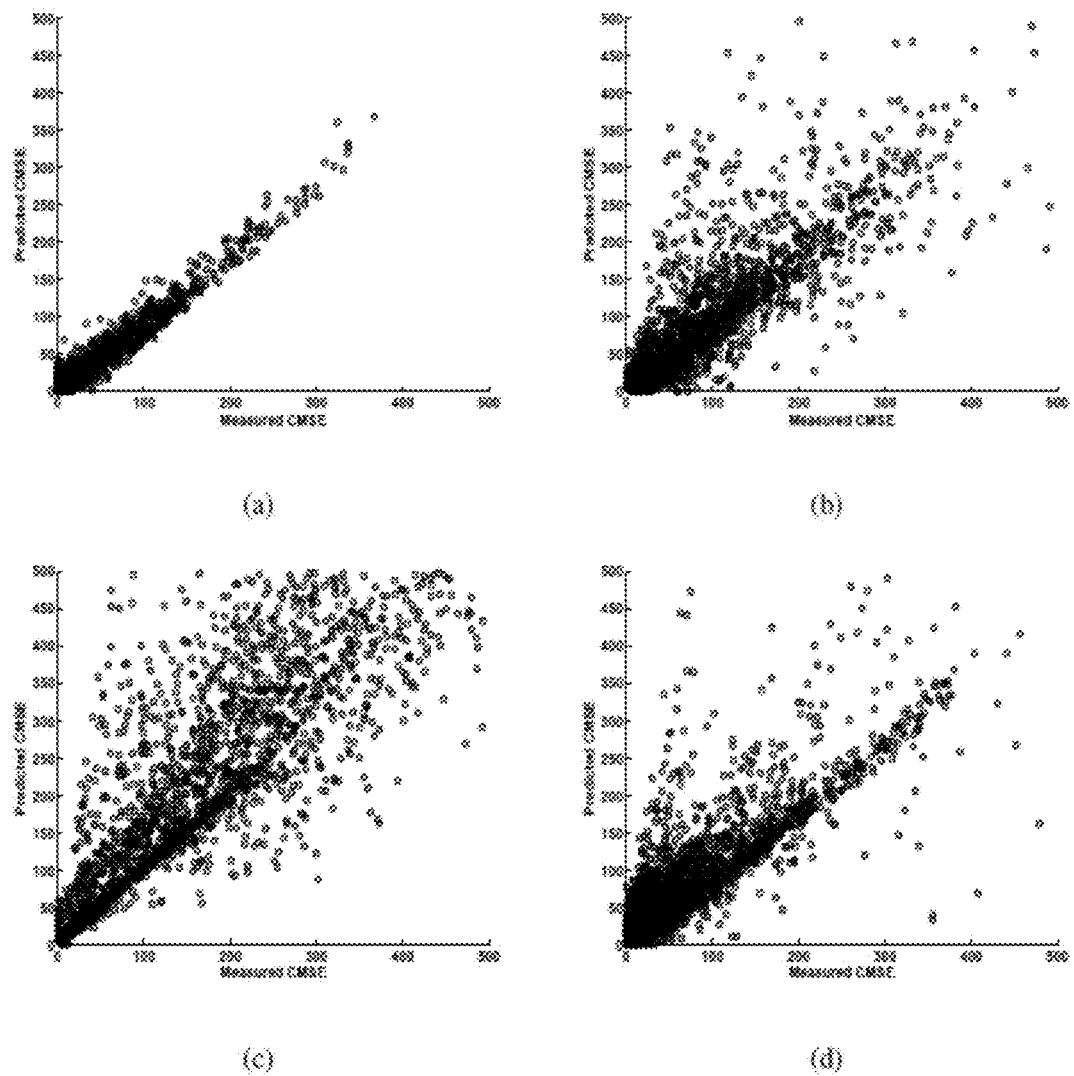
FIG. 5 is a series of Scatter plot of the predicted CMSE vs. measured CMSE for (a) Akiyo ($\widehat{\rho_A}$=0.96), (b) Foreman $\widehat{\rho_A}$=0.78), (c) Bus $\widehat{\rho_A}$=0.89), and (d) Table Tennis $\widehat{\rho_A}$=0.88).

The scatter plots in FIG. 5 are used to show the prediction accuracy of our model for the CMSE range of 0 to 500. The "Measured CMSE" label represents the measured slice CMSE values computed by decoding videos affected by individual slice losses as described in Section III, and the "Predicted CMSE" label represents the predicted slice CMSE values computed by using the GLM model. The Pearson's correlation coefficient $\rho \in [-1\ 1]$ which estimates the correlation between the predicted CMSE and the actual CMSE is obtained from the ratio of their covariance over the root of product of their variance. $\rho=1(-1)$ represents a perfect positive (negative) correlation between the two variables. The Pearson's correlation coefficients for the Akiyo, Foreman, Bus and Table Tennis are ($\hat{\rho}_A$=0.96), ($\hat{\rho}_F$=0.78), ($\hat{\rho}_B$=0.89), and ($\hat{\rho}_{T\ T}$=0.88), respectively. Larger values of $\rho$ indicate a tighter fit of the data points on the regression line.

In order to examine the performance of our model for other varying encoder configurations, we compare the correlation coefficients of our test sequences, encoded by using different GOP structure (i.e., IDR P P . . . P), bit rate, and GOP length. For example, Akiyo, Foreman, Bus and Table Tennis with the IDR P P . . . P type GOP structure have the correlation coefficients of 0.96, 0.77, 0.78, and 0.82, respectively. For Akiyo, Foreman and Bus encoded at a lower bit rate of 512 Kbps, the correlation coefficients are 0.98, 0.80 and 0.88, respectively. When the GOP length was increased from 20 frames to 60 frames, the correlation coefficients are 0.92, 0.64, 0.62, and 0.79, respectively. Therefore, we observe a strong correlation between the measured and predicted CMSE values when the GOP structure, bit rate and GOP lengths were varied. This indicates that our model is robust to variations in video characteristics and encoder configurations.

Priority Assignment for Slices

All the slices of each GOP are divided into four equally populated priority classes based on the quartiles, where the slices or priorities P1, P2, P3, and P4 correspond to the highest to the lowest CMSE values, in their decreasing order. The predicted CMSE based slice priority scheme is named Predicted CMSE GOP and the measured CMSE based slice priority scheme is named Measured CMSE GOP. The slice priorities are beneficial in designing efficient cross-layer network protocols such as routing, fragmentation, assigning access categories for IEEE802.11e, and for investigating UEP over error prone channels. Table VI shows the percentage of slices contributed by each frame type in the encoded bitstreams. On an average, the 25%, 53% and 22% slices belong to the IDR, P and B frames, respectively. The percentage of IDR slices is more for the slow motion Akiyo and decreases with increase in motion of video sequence. Table VI also shows the contribution of each frame type (as a percentage of the total number of slices in GOP) towards the four priorities. Approximately, 51% and 30% of IDR slices belong to the two highest priorities P1 and P2, respectively. However, the contribution of IDR slices to the highest priorities decreases with increase in motion of video sequence. An average of 18%, 30%, 27%, and 25% of the P slices belong to priorities P1, P2, P3 and P4, respectively. The contribution of IDR slices to the lower priorities is much less than that of the P or B frames. Majority of B slices, approximately 39% and 52% lie in the lower priorities P3 and P4, respectively. Typically, the IDR slices have the highest contribution to P1 priority followed by P slices. The P slices have the highest contribution towards the remaining three priorities, whereas the B slices have higher contributions to the two lowest priorities P3 and P4.

TABLE VI

Percentage Slices Contributed by each Frame Type to Different Priorities for Akiyo, Foreman and Bus

| Sequence | Bitrate | IDR(P1/P2/P3/P4) | P (P1/P2/P3/P4) | B(P1/P2/P3/P4) |
| --- | --- | --- | --- | --- |
| Akiyo | 512K bps | 27.7(19.2/6.7/1.8/0.0) | 51.0(5.8/17.0/16.5/11.7) | 21.3(0.0/1.0/8.5/11.8) |
|  | 1M bps | 27.4(19.2/6.8/1.3/0.1) | 53.0(6.0/16.4/15.5/15.1) | 19.6(0.0/2.0/6.8/10.8) |
| Foreman | 512K bps | 25.3(14.8/7.7/2.3/0.5) | 52.7(9.6/14.6/15.5/13.0) | 22.0(0.4/2.8/7.7/11.1) |
|  | 1M bps | 23.3(15.4/6.3/1.5/0.1) | 55.4(9.0/17.2/16.7/12.5) | 21.3(0.6/1.7/6.7/12.3) |
| Bus | 512K bps | 23.4(10.8/9.7/2.4/0.5) | 54.0(14.1/14.7/9.6/15.6) | 22.5(0.0/0.5/13.0/9.0) |
|  | 1M bps | 21.1(11.2/6.7/2.9/0.3) | 54.3(14.0/16.1/13.0/11.2) | 24.7(0.0/2.2/8.9/13.6) |

Next, the priority misclassification of slices in Predicted CMSE GOP are compared to Measured CMSE GOP. Here, $p_j=i$ for $i=1, 2, 3, 4$ represent the priority of $j^{th}$ slice assigned using measured CMSE. Then the first degree)(1° misclassification is defined if that slice were assigned a $p_j=i+1$ or $p_j=i-1$ priority using the predicted CMSE. For example, if $p_j=1$ then a first degree) (1° misclassification would result in $p_j=2$. Likewise, a second degree)(2° misclassification would result if the slice is assigned a priority of $p_j=i+2$ or $p_j=i-2$ using the predicted CMSE. In a third degree)(3° misclassification, a slice with the highest priority is assigned the lowest priority or vice versa. A 1° misclassification represents a moderate CMSE prediction error, and may be tolerable, whereas 2° and 3° misclassifications would be minimum. Also, the misclassification of higher priority slices would be minimum. Table VII shows the percentage misclassification of Akiyo, Foreman, and Bus video slices from each priority. Most of the misclassified slices belong to 1° and approximately half of them are in lower priorities P3 and P4. Only about 5% of these misclassified slices belong to the highest priority P1. The 2° misclassification is less than 4% and 3° misclassifications is almost zero. This implies that the predicted CMSE values achieve effective slice prioritization.

TABLE VII

Percentage Slice Misclassification by Degree for Each Priority for Akiyo, Foreman and Bus.

| Sequence | Bitrate | 1° (P1/P2/P3/P4) | 2° (P1/P2/P3/P4) | 3° (P1/P2/P3/P4) |
|---|---|---|---|---|
| Akiyo | 512K bps | 3.6/18.4/7.8/4.2 | 0.2/2.4/0.2/0.0 | 0.0/0.28/0.0/0.0 |
|  | 1M bps | 2.7/7.8/15.8/5.6 | 0.1/2.5/0.2/1.0 | 0.2/0.0/0.0/0.4 |
| Foreman | 512K bps | 4.9/9.3/10.0/4.9 | 0.4/0.3/1.0/0.7 | 0.0/0.0/0.0/0.2 |
|  | 1M bps | 5.2/10.2/9.5/11.0 | 0.4/0.2/1.0/0.5 | 0.0/0.0/0.0/0.0 |
| Bus | 512K bps | 4.9/9.8/9.0/3.9 | 0.6/0.2/0.5/1.7 | 0.0/0.0/0.0/0.2 |
|  | 1M bps | 4.9/10.1/8.4/3.5 | 0.5/0.4/0.6/1.1 | 0.0/0.0/0.0/0.0 |

Performance of UEP Scheme for Prioritized Slices Over AWGN Channels

Slice priorities can be used to design a UEP FEC scheme for minimizing the video distortion over lossy channels. We, therefore, designed a UEP FEC scheme for AWGN channel to compare the performance of two slice priority assignment schemes, Predicted CMSE GOP and Measured CMSE GOP. We use the following formulation to find the optimal RCPC code rate(s) for the EEP and UEP FEC schemes.

We formulate the total expected video distortion of our prioritized data. Let $R_{C\_H}$ be the transmission bit rate of the channel. The video is encoded at a frame rate of fs frames per second, and the total outgoing bit budget for a GOP of frame length LG is $R_{CH}L_G/f_s$. The RCPC code rates are chosen from a candidate set R of punctured code rates $\{R_1, R_2, R_3, \ldots, R_K\}$. The expected video distortion within the GOP is the sum of the prioritized slice loss distortion over the AWGN channel. The expected distortion of the $j^{th}$ slice depends on the CMSE distortion due to its loss, $D_p(j)$, slice error probability for a given channel SNR, slice size $S_p(j)$ in bits, and RCPC code rate $r_i$ for slice priority i selected from the candidate set R. The optimization problem for minimizing the distortion is formulated as:

$$\min_r \left\{ \sum_{i=1}^{4} \sum_{j=1}^{n_i} \left[ 1 - (1 - p_b(SNR, r_i))^{\frac{S_p(j)}{r_i}} \right] D_p(j) \right\}$$

subject to $$\sum_{i=1}^{4} \sum_{j=1}^{n_i} \frac{S_p(j)}{r_i} \leq \left( \frac{R_{CH} L_G}{f_s} \right)$$

$$r_{i-1} \leq r_i \text{ for } i = 1, 2, 3, 4$$

Here $n_i$ is the number of slices of priority i. The formulation only considers slice loss distortion and ignores compression distortion. Constraint 1 is the channel bit rate constraint and constraint 2 ensures that higher priority slices have code rates which are at least as strong as the code rates allocated to the lower priority slices. The optimization problem is solved using the Branch and Bound (BnB) algorithm with interval arithmetic analysis to yield the optimal UEP code rates. We also consider EEP based transmission over the AWGN channel where the single strongest code rate that can be used for all the slices, within the channel bit rate constraint, is determined.

Figure 6:
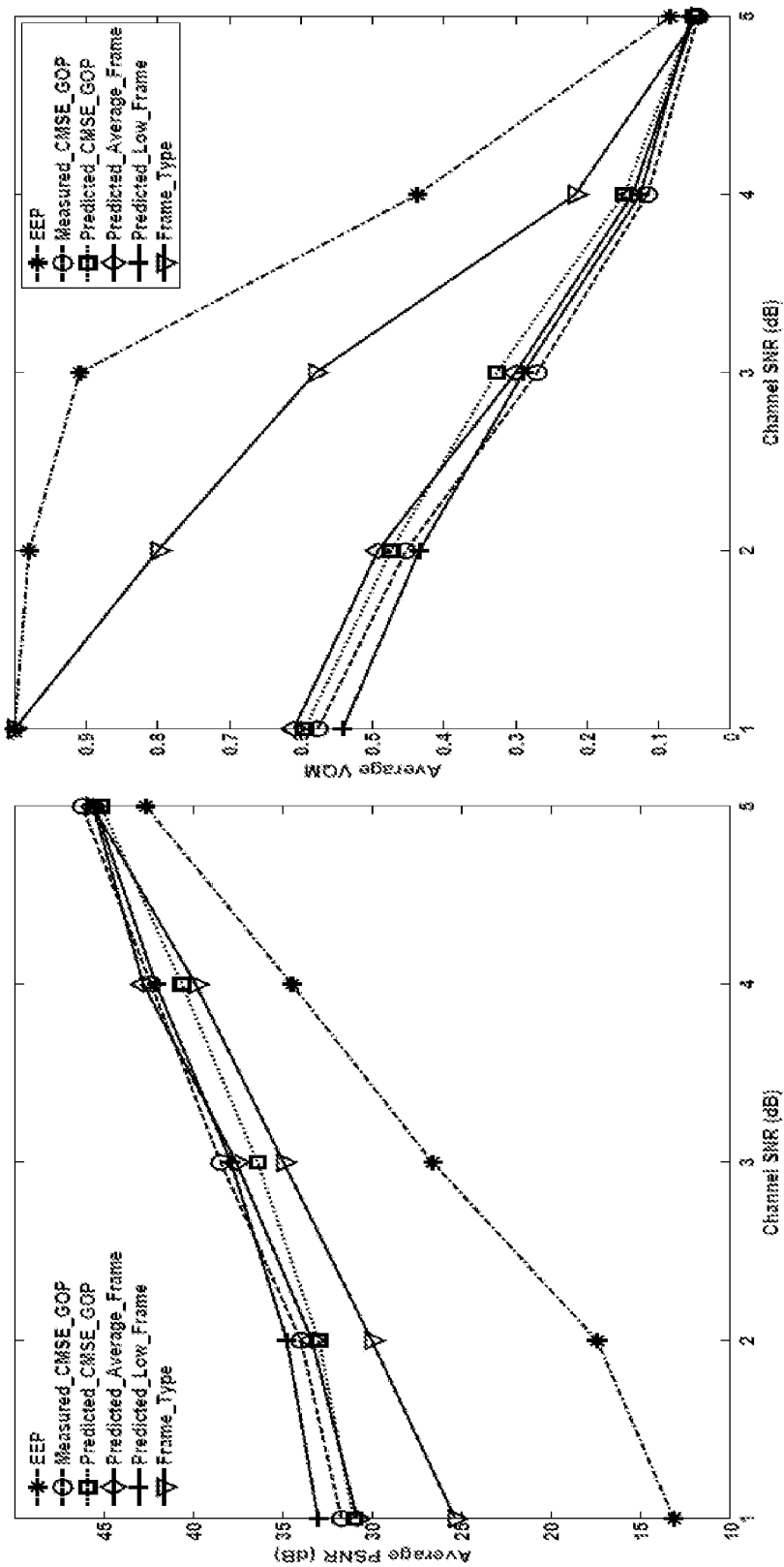
FIG. 6 consists of two line graphs showing (a) average PSNR and (b) average VQM performance of GOP and frame-level slice priority schemes over a 2 Mbps channel for Akiyo video encoded at 1 Mbps.
Figure 7:
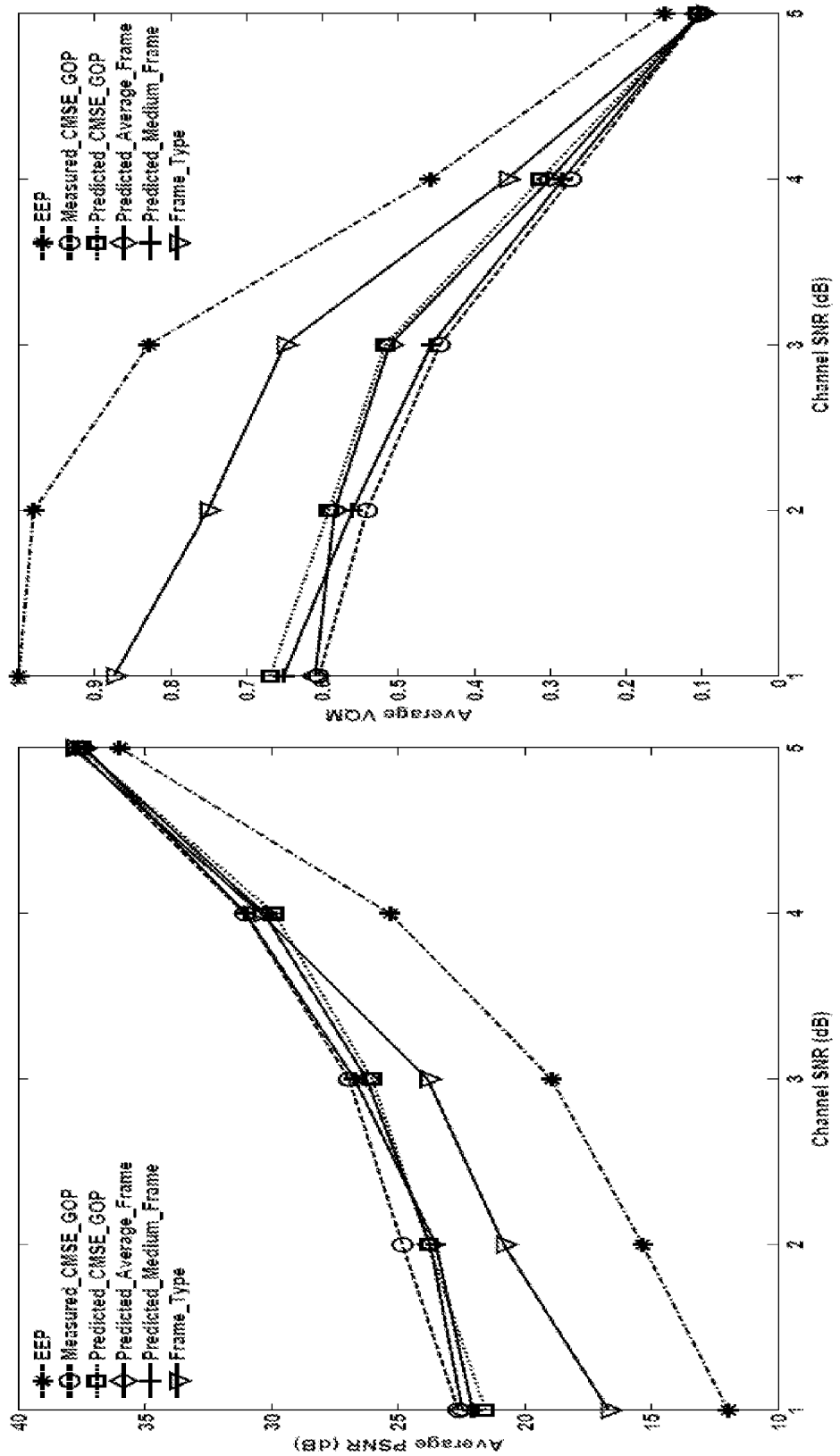
FIG. 7 consists of two line graphs showing (a) average PSNR and (b) average VQM performance of GOP and frame-level slice priority schemes over a 2 Mbps AWGN channel for Foreman video encoded at 1 Mbps.
Figure 8:
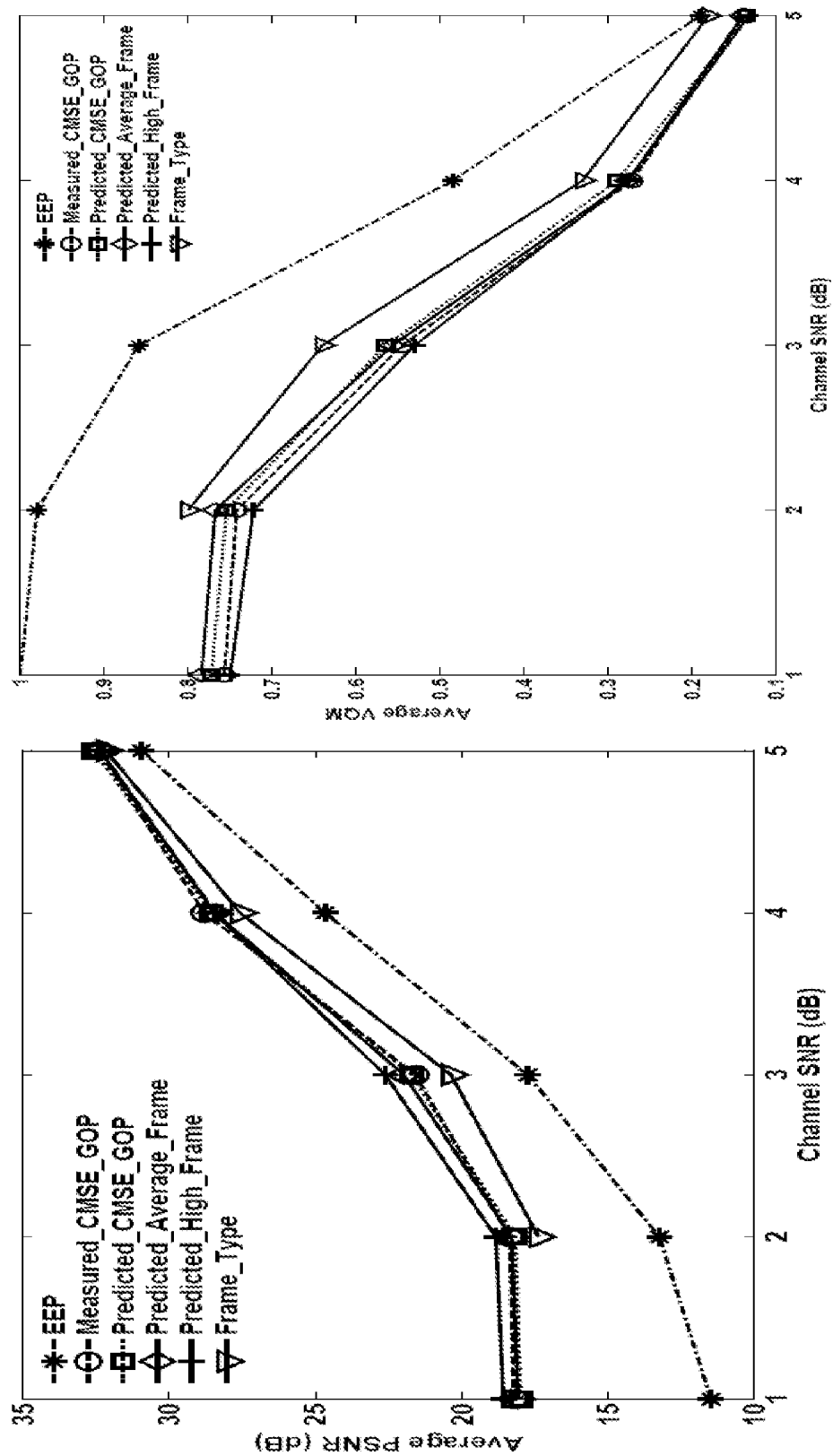
FIG. 8 consists of two line graphs showing (a) average PSNR and (b) average VQM performance of GOP and frame-level slice priority schemes over a 2 Mbps AWGN channel for Bus video encoded at 1 Mbps.

The mother code of the RCPC code has rate 1/4 with memory M=4 and puncturing period P=8. Log-likelihood ratio (LLR) was used in the Viterbi decoder. The RCPC rates were $\{(8/9), (8/10), (8/12), (8/14), (8/16), (8/18), (8/20), (8/22), (8/24), (8/26), (8/28), (8/30), (8/32)\}$. The channel bit rate used for videos encoded at 1 Mbps is 2 Mbps. FIGS. 6 to 8 show the average PSNR and video quality metric (VQM) computed over 100 realizations of each AWGN channel SNR for Akiyo, Foreman and Bus. At channel SNR<1 dB, the videos with EEP could not be decoded since too many slices were corrupted, whereas the performance of the EEP and UEP schemes converges for channel SNR>5. A VQM value of 0(1) represents the best (worst) video quality. The UEP performance of Predicted_CMSE_GOP scheme closely follows that of the Measured_CMSE_GOP within a PSNR range of 0.1-1 dB. This demonstrates that our predicted CMSE based priority assignment scheme performs well. Both UEP schemes have a significant gain over EEP since greater protection is provided to higher priority slices at the expense of more lower priority slices being lost due to channel errors. Other schemes shown in these figures will be discussed in the next section.

Frame-Level Slice Priority Assignments Schemes

The GOP-based slice priority assignment scheme Predicted CMSE GOP requires the predicted CMSE values of all the slices of a GOP before it can assign priority to them. This introduces the delay of at least one GOP time, which may not be acceptable in the real-time applications with stringent delay constraints, such as video conferencing. In this section, the frame-level slice priority assignment schemes are presented, which determine the priority of the slices of a frame based on their predicted CMSE, the frame type and location within the GOP, and video motion activity (i.e., low, medium and high). This facilitates "on-the-fly" slice prioritization, without requiring the slices of future frames in the GOP.

For videos of a given motion type (shown in Table I), we use the Measured CMSE GOP scheme to compute the average percentage of slices in each priority class contributed by each frame within a GOP, as shown in Table VIII. These frame-level schemes are named Predicted High Frame, Predicted Medium Frame, and Predicted Low Frame, for the high, medium, and low mobility sequences, respectively. The Predicted Average Frame scheme in Table VIII represents the average percentage of slices in each priority class contributed by each frame within all the GOPs across all the sequences in our video database, regardless of their motion activity. These values are based on the encoder parameters given in Section IV. Our GOP structure consists of one IDR frame, nine P frames, and ten B frames. Since the B frames are not used as reference frames, we have combined them together. These values may vary when the bit rate or GOP configuration changes.

The performance of a simple frame type and location based priority assignment scheme is also examined and named Frame Type, where all the IDR slices are assigned to the highest priority P1, all the slices of the first half of P frames of each GOP to P2, the P frame slices from the latter part of each GOP to P3, and all the B frame slices to the lowest priority P4, without considering their CMSE values.

There is a higher percentage of IDR and P slices in higher priorities P1 and P2 across all the priority schemes in Table VIII. The percentage of IDR slices in P1 is highest for the Predicted Low Frame scheme as the CMSE range for the P and B frames is small due to effective motion estimation and prediction in low mobility videos, compared to the higher mobility videos. With the exception of Predicted High Frame scheme, where approximately 22% of B slices are in P1 and P2 priorities, other frame-level schemes have a much lower percentage of B slices in these higher priorities. The contribution of P frames to P1 and P2 priorities is the highest for Predicted High Frame scheme as higher mobility videos have larger CMSE ranges due to more complex motion.

Frame-Level Slice Priority Assignment Schemes

We use a UEP scheme to study the performance of these frame-level slice prioritization schemes over AWGN channels for three CIF test videos (slow motion Akiyo, medium motion Foreman, and high motion Bus) encoded at 1 Mbps. FIGS. 6 to 8 show the average PSNR and VQM performance of the GOP-level Measured CMSE GOP and Predicted CMSE GOP schemes, the frame-level Predicted low Frame, Predicted Medium Frame, Predicted High Frame, and Predicted Average Frame schemes, and the Frame type scheme. As discussed in previous section, the performance of Predicted CMSE GOP scheme closely follows that of Measured CMSE GOP. Generally, the frame-level priority assignment schemes achieve a performance which is very close to the GOP-based slice priority schemes. The performance of Predicted Average Frame schemes is slightly lower than the motion-based frame-level slice prediction schemes. However, the heuristic Frame Type scheme performs significantly worse than other frame based schemes.

TABLE VIII

Average Percentage Slice Priority Contributions for Each Frame Type and Location within the GOP

| Frame Type | High Frame | Medium Frame | Low Frame | Average Frame |
|---|---|---|---|---|
| IDR | (46/31/17/6) | (61/28/8/3) | (73/21/5/1) | (53/28/14/5) |
| P Frame 1 | (45/27/19/9) | (29/42/22/8) | (40/35/16/9) | (36/34/20/10) |
| P Frame 2 | (44/33/15/8) | (25/41/23/11) | (30/40/22/8) | (34/37/19/10) |
| P Frame 3 | (43/28/16/13) | (24/42/24/10) | (26/45/18/11) | (30/38/20/12) |
| P Frame 4 | (38/33/18/11) | (16/37/33/14) | (22/44/24/10) | (25/35/27/13) |
| P Frame 5 | (30/35/21/14) | (12/33/33/22) | (12/45/27/16) | (19/35/29/17) |
| P Frame 6 | (24/34/27/15) | (8/28/38/26) | (6/36/33/25) | (14/31/33/22) |
| P Frame 7 | (17/30/30/23) | (9/22/40/29) | (2/21/40/37) | (10/26/35/29) |
| P Frame 8 | (10/20/36/34) | (1/12/37/50) | (3/15/30/52) | (5/20/36/39) |
| P Frame 9 | (3/13/23/61) | (0/1/21/78) | (2/11/18/69) | (2/9/18/71) |
| B | (6/16/35/43) | (0/0/1/99) | (0/10/38/52) | (0/10/19/71) |

Application of Slice Prioritization to Slice Discard

In this section, we present an application of our slice prioritization schemes for slice discard in a network affected by congestion. We consider a simple topology, where two video users $VS_1$ and $VS_2$ are transmitting video data at R1 Kbps and R2 Kbps, respectively, to the destination (D) through an intermediate router. When there is no congestion, the outgoing rate R of the intermediate router equals to (R1+R2) Kbps. We study the slice discard performance of three slice prioritization schemes Measured CMSE GOP, Predicted CMSE GOP, and Predicted Average Frame. In these schemes, the lowest priority slices are dropped from different frames of each GOP. We also study the performance of a Drop-Tail (DT) scheme where the slices are discarded from the tail end of each GOP.

We use two video sequences Foreman ($VS_1$) and Bus ($VS_2$) encoded at 1 Mbps each. The outgoing bit rate of the intermediate router is 2 Mbps. The error free PSNR values of the two sequences are 38.9 dB and 33.4 dB, respectively. Table IX shows the video PSNR and VQM results obtained by discarding slices intelligently over the traditional DT scheme when the outgoing rate R drops from 2 Mbps to 1.8 Mbps (10% loss) and 1.4 Mbps (30% loss). We distribute the slice losses equally between the two users. When the outgoing rate decreases from 10% of the overall rate to 30% of the rate, the PSNR performance of each scheme drops by 3 dB (approximately). We observe that the performance of Predicted CMSE GOP and Predicted Average Frame schemes closely follows the performance of Measured CMSE GOP scheme. Our slice prioritization schemes achieve at least 2 dB PSNR and corresponding VQM gain over the DT scheme, as dropping consecutive slices of frame(s) from the tail end of each GOP in DT scheme degrades the video quality significantly.

TABLE IX

Performance of the Slice Discard Schemes

| | PSNR (dB) | | | | VQM | | | |
|---|---|---|---|---|---|---|---|---|
| | Slice Loss (%) | | | | | | | |
| Slice Discard | 10% | | 30% | | 10% | | 30% | |
| Scheme | $VS_1$ | $VS_2$ | $VS_1$ | $VS_2$ | $VS_1$ | $VS_2$ | $VS_1$ | $VS_2$ |
| Measured CMSE GOP | 34.8 | 28.7 | 31.4 | 25.3 | 0.257 | 0.324 | 0.334 | 0.561 |
| Predicted CMSE GOP | 33.5 | 28.4 | 30.8 | 24.7 | 0.290 | 0.325 | 0.343 | 0.571 |
| Predicted Average Frame | 33.8 | 28.0 | 29.8 | 25.1 | 0.289 | 0.382 | 0.357 | 0.591 |
| Droptail | 31.2 | 26.0 | 27.8 | 22.9 | 0.335 | 0.501 | 0.381 | 0.750 |

Computer Systems

The systems and methods described above may advantageously be implemented using a computer-based approach, and the present invention therefore includes a computer system for practicing the methods. A computer system comprises a number of internal components and is also linked to external components. The internal components include processor element interconnected with main memory. The external components include mass storage, e.g., one or more hard disks (typically of 1 GB or greater storage capacity). Additional external components include user interface device, which can be a keyboard and a monitor including a display screen, together with pointing device, such as a "mouse", or other graphic input device. The interface allows the user to interact with the computer system, e.g., to cause the execution of particular application programs, to enter inputs such as data and instructions, to receive output, etc. The computer system may further include disk drive, CD drive, and/or other external drive for reading and/or writing information from or to external media respectively. Additional components such as DVD drives, USB ports, cloud storage on the internet, etc., are also contemplated.

The computer system is typically connected to one or more network lines or connections, which can be part of an Ethernet, wireless, cellular, direct cable, or similar link to other local computer systems, remote computer systems, or wide area communication networks, such as the Internet. This network link allows the computer system to share data and processing tasks with other computer systems and to communicate with remotely located users. The computer system may also include components such as a display screen, printer, etc., for presenting information, e.g., for displaying graphical representations of gene networks.

A variety of software components, which are typically stored on mass storage, will generally be loaded into memory during operation of the inventive system. These components function in concert to implement the methods described herein. The software components include operating system, which manages the operation of computer system and its network connections. This operating system can be, for purpose of example and not of limitation, a Microsoft Windows® operating system such as Windows Vista® or Windows 7®, a Macintosh operating system such as Leopard® or Snow Leopard®, a Unix or Linux operating system, an OS/2 or MS/DOS operating system, etc.

The software component is intended to embody various languages and functions present on the system to enable execution of application programs that implement the inventive methods. Such components include, for example, language-specific compilers, interpreters, and the like. Any of a wide variety of programming languages may be used to code the methods of the invention. Such languages include, but are not limited to, C (see, for example, Press et al., 1993, Numerical Recipes in C: The Art of Scientific Computing, Cambridge Univ. Press, Cambridge, or the Web site having URL www.nr.com for implementations of various matrix operations in C), C++, Fortran, JAVA™, various languages suitable for development of rule-based expert systems such as are well known in the field of artificial intelligence, etc. According to certain embodiments of the invention the software components include a Web browser, for interacting with the World Wide Web, or other known wired or wireless transmission device for more secure transmissions.

The software component represents the methods of the present invention as embodied in a programming language of choice. In particular, the software component includes code to accept a set of activity measurements and code to estimate parameters of an approximation to a set of equations and steps representing a poker gaming system. Included within the latter is code to implement one or more fitness functions. Code to calculate variances and other statistical metrics, as described above, may also be included. Additional software components to display the network model may also be included. According to certain embodiments of the invention a user is allowed to select various among different options for fitness function, statistical measures and significance, etc. The user may also select various criteria and threshold values for use in identifying major regulators of particular species and/or of the network as a whole. The invention may also include one or more databases that contain sets of parameters for a plurality of different models, statistical package, and other software components such as sequence analysis software, etc.

Conclusions

We presented a robust, low-complexity and low-delay GLM to predict the CMSE of a slice loss using a combination of video factors that can be extracted while a frame is being encoded. We demonstrated the accuracy of prediction model using scatter plots, ANOVA and cross-validation; and showed that it was robust to different GOP structures, GOP lengths and encoding bit rates. The slices of each GOP were classified into four priorities using the measured and predicted CMSE values, and their performance was validated over noisy AWGN channels. We extended our GOP prioritization scheme to achieve frame-level prioritization for videos of different mobility. We also analyzed the priority misclassifications and showed that second degree and third degree priority misclassifications were minimal. We also demonstrated an application of our prioritization towards slice discard in a congested network.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable Equivalents.

REFERENCES

[1] T. Wiegand, G. J. Sullivan, G. Bjntegaard, and A. Luthra, "Overview of the H.264/AVC video coding standard," IEEE Trans. on Circuits and Systems for Video Technology, vol. 13, no. 7, pp. 560-576, July 2003.

[2] S. Paluri, K. K. R. Kambhatla, S. Kumar, B. Bailey, and P. C. Cosman, "Predicting slice loss distortion in H.264/AVC video for low complexity data prioritization," in ICIP, 2012.

[3] T.-L. Lin, S. Kanumuri, Y. Zhi, D. Poole, P. Cosman, and A. R. Reibman, "A versatile model for packet loss visibility and its application to packet prioritization," IEEE Trans. on Image Processing, vol. 19, no. 3, pp. 722-735, March 2010.

[4] A. R. Reibman, V. A. Vaishampayan, and Y. Sermadevi, "Quality monitoring of video over a packet network," IEEE Trans. on Multimedia, vol. 6, no. 2, pp. 327-334, March 2004.

[5] S. Kanumuri, P. Cosman, A. R. Reibman, and V. A. Vaishampayan, "Modeling packet-loss visibility in MPEG-2 video," IEEE Trans. on Multimedia, vol. 8, no. 2, p. 341, April 2006.

[6] S. Kanumuri, S. G. Subramanian, P. Cosman, and A. R. Reibman, "Predicting H.264 packet loss visibility using generalized linear model," in IEEE Int. Conf. on Image Processing, October 2006, p. 2245.

[7] A. Reibman and D. Poole, "Predicting packet-loss visibility using scene characteristics," in IEEE Int. Conf. on Packet Video, November 2007, pp. 308-317.

[8] L. Breiman, "Random Forests," Machine Learning, vol. 45, no. 1, 2001.

[9] A. R. Reibman and D. Poole, "Characterizing packet-loss impairments in compressed video," in IEEE Int. Conf. on Image Processing, vol. 5, November 2007, pp. 77-80.

[10] H.264/AVC reference software JM14.2, ISO/IEC Std. [Online]. Available: http://iphome.hhi.de/suehring/tml/download/

[11] S. K. Bandyopadhyay, Z. Wu, P. Pandit, and J. M. Boyce, "An error concealment scheme for entire frame losses for H.264/AVC," in IEEE International Sarnoff Symposium on Circuits and Systems, March 2006, pp. 1-4.

[12] P. McCullagh and J. Nelder, Generalized Linear Models, D. R. Cox and D. V. Hinkley, Eds. Chapman and Hall, 1983.

[13] The R Project for Statistical Computing. [Online]. Available: http://www.r-project.org/

[14] H. Akaike, "A new look at the statistical model identification," IEEE Trans. on Automatic Control, vol. 19, no. 6, pp. 716-723, January 1974.

We claim:

1. A system for prioritizing video slices of H.264 video bitstream comprising: a memory storage and a processing unit coupled to the memory storage, wherein the processing unit operates to execute a low complexity scheme to predict the expected cumulative mean squared error (CMSE) contributed by the loss of a slice of H.264 video bitstream, wherein the processing unit operates to execute a series of actions comprising the following steps performed in order:

assigning each slice a predicted value according to the low complexity scheme;

extracting video parameters during encoding process; and using a generalized linear model to model CMSE as a linear combination of a plurality of the video parameters, wherein the video parameters of step (b) are derived from analytical estimations using a Generalized Linear Model (GLM) over a video database, said database comprising videos of different characteristics, said characteristics comprising high and low motion, camera panning, zooming and still videos, further comprising wherein the GLM is constructed in a training phase according to the following steps performed in order:

determining a distribution of the computed CMSE to be a Normal distribution with the Identity link function;

sequentially adding covariates using the forward selection technique whereby a best model is evaluated at each stage using the Akaike's Information Criterion (AIC);

generating regression coefficients during the training phase of the model;

validating a final model through a testing phase by predicting the CMSE for different video sequences, said different video sequences not in the training database; and using the regression coefficients to predict expected CMSE values for each slice.

2. The system of claim 1, wherein the extracted parameters of step (b) are: Motion Vectors (Motx and Moty), Residual Energy after motion compensation (MAXRESENGY), Initial Mean squared Error (IMSE), Initial Structural Similarity Index (IS SIM), Average Inter Partitions per macroblock (MB) (AvgInterParts), Error Propagation length (TMDR), slice type (slice_type) and signal characteristics such as signal mean and variance per slice (SigMean and SigVar).

3. The system of claim 2, further comprising the step of examining the interactions between IMSE and MAXRESENGY and IMSE and TMDR.

4. The system of claim 1, further comprising wherein the distortion prediction is computed by using a GLM model to predict CMSE, whereby CMSE is computed over the group of pictures (GOP) by dropping one H.264 video slice at a time, and further resolving the issue of GOP delay by developing a statistical model to predict the expected distortion.

5. The system of claim 1, further comprising wherein per frame priority can be assigned where the slices of each frame are classified into two or four priorities separately in systems with stringent delay requirements.

6. The system of claim 1, further comprising wherein the priorities can be assigned at the GOP level in delay tolerant systems.

7. A method of identifying the video parameters (from compressed H.264 bitstream) and their contribution to predicted CMSE by using the system of claim 1.

8. A method of claim 7, further comprising wherein there is no need to calculate CMSE over the entire GOP.

9. The method of claim 7, wherein the encoder assigns priorities for each encoded slice based on its predicted CMSE without having to wait for the GOP statistics to assign the priorities unlike the traditional priority schemes.

* * * * *